United States Patent
Hwang et al.

(10) Patent No.: US 10,009,567 B2
(45) Date of Patent: Jun. 26, 2018

(54) GROUP SELECTION CIRCUIT, AND COLUMN READOUT DEVICE AND METHOD THEREOF

(71) Applicant: SK hynix Inc., Gyeonggi-do (KR)

(72) Inventors: Won-Seok Hwang, Gyeonggi-do (KR); Si-Wook Yoo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/456,701

(22) Filed: Mar. 13, 2017

(65) Prior Publication Data

US 2017/0374308 A1    Dec. 28, 2017

(30) Foreign Application Priority Data

Jun. 27, 2016 (KR) .................. 10-2016-0079979

(51) Int. Cl.
*H04N 5/378* (2011.01)
*H04N 5/369* (2011.01)
*H04N 5/374* (2011.01)
*H04N 5/3745* (2011.01)

(52) U.S. Cl.
CPC ........... *H04N 5/378* (2013.01); *H04N 5/3698* (2013.01); *H04N 5/3745* (2013.01)

(58) Field of Classification Search
CPC ..... H04N 5/378; H04N 5/3698; H04N 5/3745
See application file for complete search history.

(56) References Cited

U.S. PATENT DOCUMENTS 8,514,310 B2    8/2013 Ang

FOREIGN PATENT DOCUMENTS

KR    101365109    2/2014

*Primary Examiner* — Gevell Selby
(74) *Attorney, Agent, or Firm* — IP & T Group LLP

(57) ABSTRACT

A group selection circuit includes an input block suitable for receiving a last column select signal of a previous column switch group and a last column select signal of a current column switch group; and a group selection block suitable for generating a group select signal that is activated from a first edge of the last column select signal of the previous column switch group to a first edge of the last column select signal of the current column switch group, in response to an output signal of the input block.

20 Claims, 10 Drawing Sheets

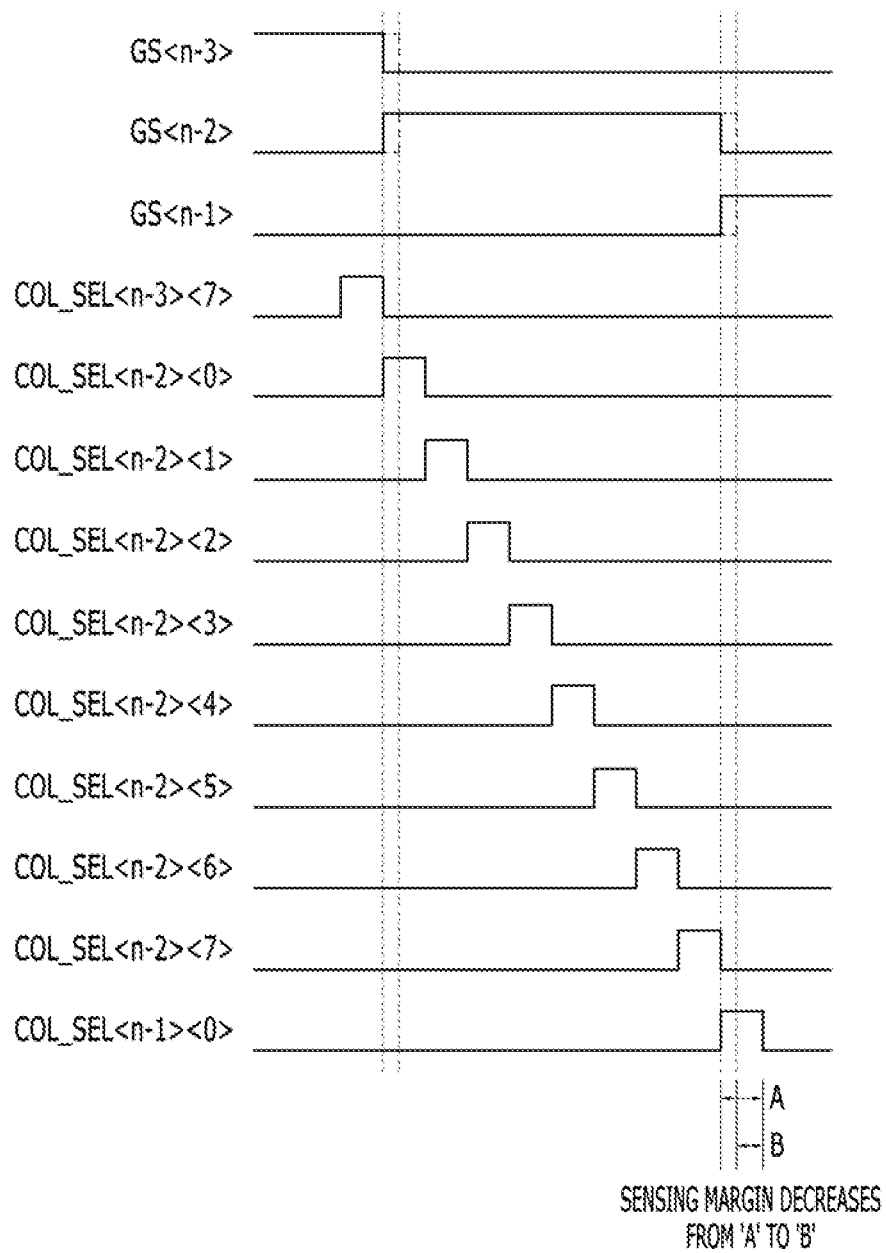

GROUP SELECTION CIRCUIT, AND COLUMN READOUT DEVICE AND METHOD THEREOF

CROSS-REFERENCE TO RELATED APPLICATIONS

The present application claims priority of Korean Patent Application No. 10-2016-0079979, filed on Jun. 27, 2016, which is incorporated herein by reference in its entirety.

BACKGROUND

1. Field

Various embodiments of the present invention relate to a device having a column parallel structure such as complementary metal oxide semiconductor (CMOS) image sensor and, more particularly, to a group selection circuit for preventing a sensing error prone to occur during a high speed readout operation, a column readout device employing the group selection circuit, and a method thereof.

2. Description of the Related Art

In a circuit having a column parallel structure such as a CMOS image sensor, an increase in the number of columns leads to an increase in the number of column switches for selecting a column to be read out and thus a parasitic capacitance of a column readout sensing node. The increase in the parasitic capacitance delays formation of a sensing voltage during a column readout operation and lowers a readout speed. In order to reduce the parasitic capacitance of the column readout sensing node, the column switches are grouped into a plurality of groups and a group selection switch is provided for each of the column switch groups to select the corresponding column switch group.

However, according to a binary-controlled group selection scheme that is typically used for selecting a group, a sensing error may occur in a first column in a column switch group due to a timing mismatch between a group select signal and a column select signal. Furthermore, floating of a column readout sensing node before an operation of a corresponding group selection switch may also bring about an error signal when sensing a first column in a column switch group.

SUMMARY

Various embodiments of the present invention are directed to an improved group selection circuit capable of preventing a sensing error caused by a timing mismatch between a group select signal and a column select signal. The group selection circuity can generate a group select signal based on a column select signal.

Further embodiments are directed to a column readout device employing the group selection circuit, and a method thereof of reading out columns of a device having a column parallel structure such as a CMOS image sensor.

Additionally, various embodiments are directed to a device and a method of reading out columns capable of reducing a reading error that may occur due to floating of a sensing node when selecting a column switch group by initializing a column switch group node before selecting a group selection switch.

In accordance with an embodiment of the present invention, a group selection circuit may include an input block suitable for receiving a last column select signal of a previous column switch group and a last column select signal of a current column switch group; and a group selection block suitable for generating a group select signal that is activated from a first edge of the last column select signal of the previous column switch group to a first edge of the last column select signal of the current column switch group, in response to an output signal of the input block.

In accordance with an embodiment of the present invention, a column readout device may include a plurality of group selection circuits suitable for generating a group select signal in response to a last column select signal of a previous column switch group and a last column select signal of a current column switch group; a plurality of group selection switches suitable for selecting one of a plurality of column switch groups in response to the group select signal; and the plurality of column switch groups, each having a plurality of column switches suitable for selecting one of input data for respective column lines in response to a column select signal, in a state of being selected by a corresponding group selection switch among the plurality of group selection switches, to transfer the selected input data to a column readout sensing node through a corresponding column switch group node.

The column readout device may further include a plurality of initialization switches suitable for initializing the corresponding column switch group node before the column switch group is selected among the plurality of column switch groups.

In accordance with an embodiment of the present invention, a column readout method may include activating a current group selection switch in response to a first edge of a last column select signal of a previous column switch group; and deactivating the current group selection switch in response to at a first edge of a last column select signal of a current column switch group.

The column readout method may further include initializing a column switch group node connected to an output terminal of each of the column switch groups.

According to the embodiments, it is possible to prevent a sensing error caused by a timing mismatch between a group select signal and a column select signal by generating the group select signal based on the column select signal.

According to the embodiments, it is possible to minimize a reading error that may occur due to floating of a column readout sensing node when selecting a column switch group by initializing a column switch group node before selecting a group selection switch.

Also, according to the embodiments, it is possible to enhance a readout speed during a column data sensing operation.

BRIEF DESCRIPTION OF THE DRAWINGS

FIG. 2C is a timing diagram illustrating a binary-controlled group selection scheme.

DETAILED DESCRIPTION

Figure 1A:
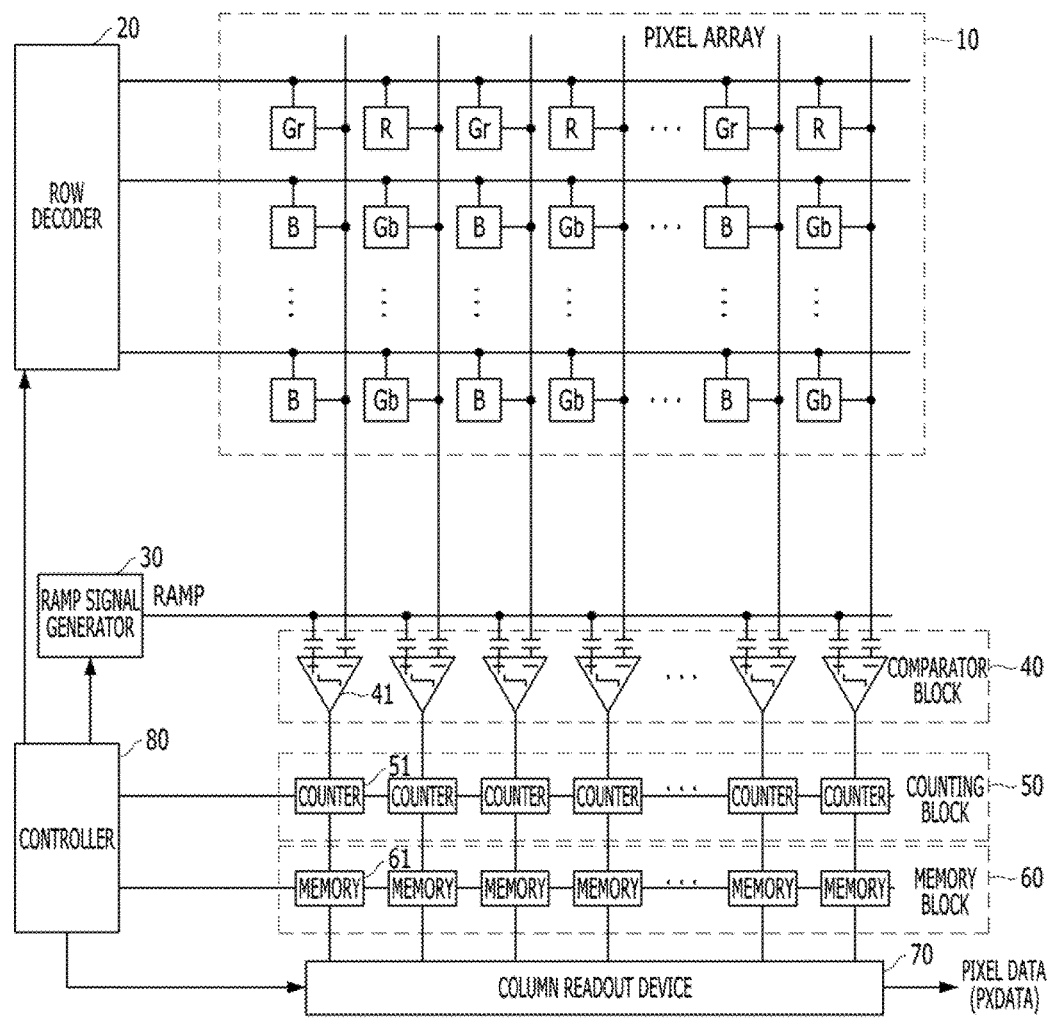
FIG. 1A is a block diagram illustrating an exemplary conventional CMOS image sensor.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In this disclosure, when one part is referred to as being 'connected' to another part, it should be understood that the former can be 'directly connected' to the latter, or 'electrically connected' to the latter via an intervening part. Furthermore, when it is described that one 'comprises', 'includes' or 'has' some elements, it should be understood that it may comprise, Include, or have only those elements, or it may comprise, include, or have other elements as well as those elements if there is no specific limitation. The terms of a singular form may include plural forms unless referred to the contrary.

FIG. 1A is a block diagram illustrating an exemplary conventional CMOS image sensor. The CMOS image sensor shown in FIG. 1A has a column parallel structure and employs a local counting scheme.

Referring to FIG. 1A, a CMOS image sensor includes a pixel array 10, a row decoder 20, a ramp signal generator 30, a comparator block 40, a counting block 50, a memory block 60, a column readout device 70, and a controller 80.

The pixel array 10 generates and outputs pixel signals corresponding to incident light. The row decoder 20 selects pixels in the pixel array 10 by row lines under a control of the controller 80 including, for example, a timing generator to allow control of the operation of the pixels in the selected row line. The ramp signal generator 30 generates a ramp signal RAMP under the control of the controller 80. The comparator block 40 compares each of the pixel signals received through the column lines from the pixels of the pixel array 10 with the ramp signal RAMP received from the ramp signal generator 30. The comparator block 40 provides the comparison signals as output signals to the counter block 50.

The counting block 50 counts a clock from the controller 80 according to each of the output signals of the comparator block 40. The memory block 60 stores count information received from the counting block 50 under the control of the controller 80. The column readout device 70 sequentially outputs the count information stored in the memory block 60 as pixel data PXDATA under the control of the controller 80. The controller 80 controls the operation of the row decoder 20, the ramp signal generator 30, the counting block 50, the memory block 60, and the column readout device 70.

In general, the COMS image sensor subtracts a level of the pixel signal before the incidence of the light from a level of the pixel signal when the light is incident on the CMOS image sensor in order to eliminate an undesired offset existing intrinsically in the pixel signal output by the COMS image sensor and allow a precise measurement of the pixel signal caused by the incident light. Such an operation is referred to as a correlated double sampling (CDS) and is performed in the comparator block 40.

The comparator block 40 includes a plurality of comparators, each comparator corresponding to a respective column of the pixel array 10. The counting block 50 includes a plurality of counters provided for the respective columns of the pixel array 10. The memory block 60 includes a plurality of memories provided for the respective columns in the pixel array 10.

The operation of the CMOS image sensor shown in FIG. 1A will now be briefly described, for example, in terms of a single comparator, a single counter, and a single memory.

A first comparator 41 receives the pixel signal from a first column of the pixel array 10 and the ramp signal RAMP from the ramp signal generator 30 through its first and second input terminals, respectively, and compares the signals to output a comparison signal.

The voltage level of the ramp signal RAMP decreases or increases gradually over time and, as a result, there is an instant during a period of the ramp signal that the two signals received by the first comparator 41 have the same level. At such an instant, the comparison signal output by the comparator 41 is inverted.

A first counter 51 counts the clock output by the controller 80 from an instant that the ramp signal RAMP starts to decrease or increase to the instant that the comparison signal is inverted, and outputs count information. The counters in the counting block 50 including the first counter 51 may be initialized by a reset signal from the controller 80.

A first memory 61 stores the count information from the first counter 51 in response to a load signal from the controller 80, and outputs the stored count information to the column readout device 70.

Figure 1B:
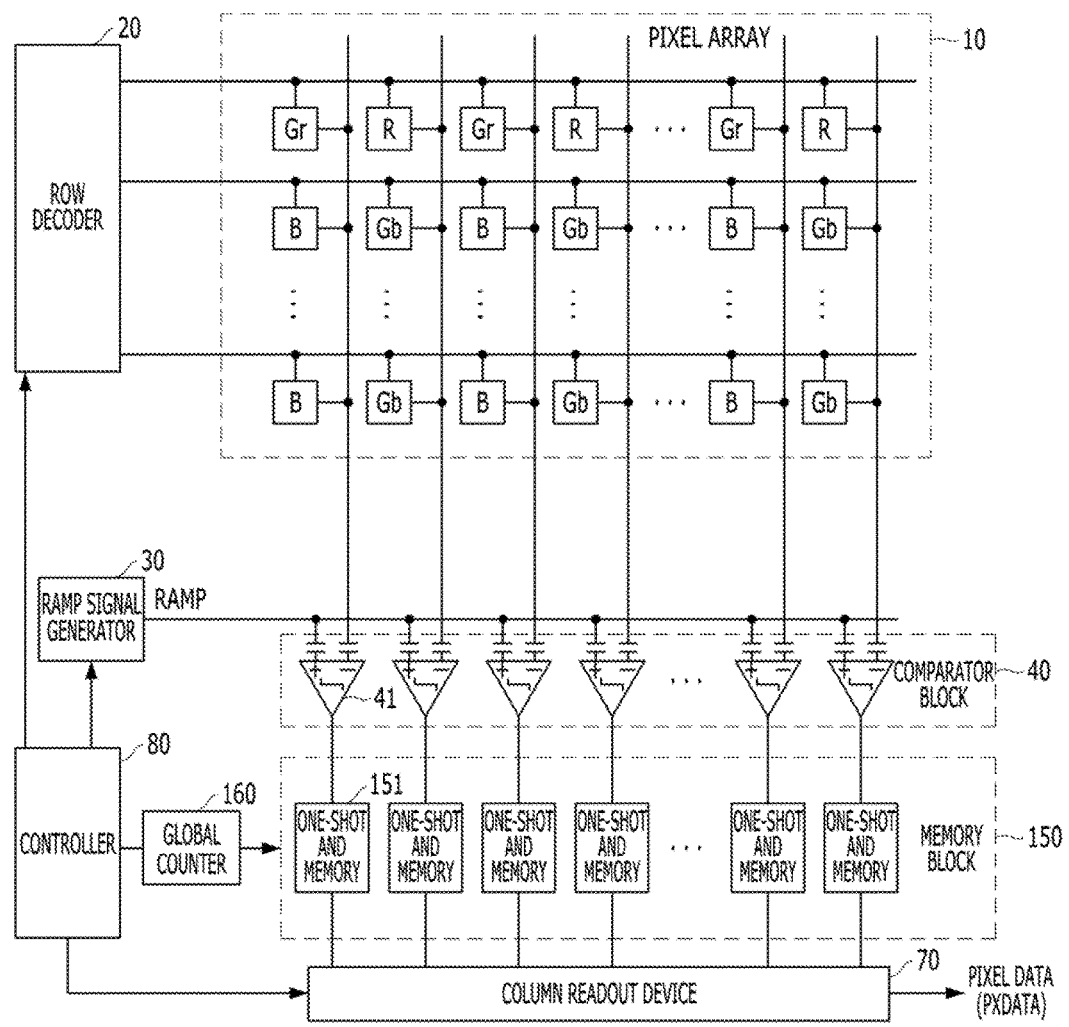
FIG. 1B is a block diagram illustrating another exemplary conventional CMOS image sensor.

FIG. 1B is a block diagram illustrating another exemplary conventional CMOS image sensor. The CMOS image sensor shown in FIG. 1B has a column parallel structure and employs a global counting scheme. In FIGS. 1A and 1B, like reference numerals are used to refer to the same elements.

Referring to FIG. 1B, the CMOS image sensor includes the pixel array 10, the row decoder 20, the ramp signal generator 30, the comparator block 40, a global counter 160, a memory block 150, the column readout device 70, and the controller 80.

The pixel array 10 generates and outputs pixel signals corresponding to incident light. The row decoder 20 selects pixels in the pixel array 10 by row lines under a control of the controller 80 including, for example, a timing generator to allow control of the operation of the pixels in the selected row line. The ramp signal generator 30 generates a ramp signal RAMP under the control of the controller 80. The comparator block 40 compares each of the pixel signals output from columns of the pixel array 10 with the ramp signal RAMP from the ramp signal generator 30.

The global counter 160 counts a clock under the control of the controller 80 to output global count values. The memory block 150 latches the global count values from the global counter 160 according to output signals of the comparator block 40 to store the latched global count values as local count values for respective columns. The column readout device 70 sequentially outputs the local count values stored in the memory block 150 as pixel data PXDATA under the control of the controller 80. The controller 80 controls the operation of the row decoder 20, the ramp signal generator 30, the global counter 160, the memory block 150, and the column readout device 70.

The comparator block 40 includes a plurality of comparators provided for respective columns in the pixel array 10. The memory block 150 includes a plurality of one-shot and memory units provided for respective columns in the pixel array 10.

The operation of the CMOS image sensor shown in FIG. 1B will be briefly described, for example, in terms of a single comparator and a single one-shot and memory unit.

A first comparator 41 receives the pixel signal from a first column of the pixel array 10 and the ramp signal RAMP from the ramp signal generator 30 through its first and second input terminals, respectively, and compares the signals to output a comparison signal.

A one-shot and memory unit 151 includes a one-shot circuit (not shown) and a memory (not shown). The one-shot circuit generates a storage instruction signal in response to the comparison signal, and the memory latches the global count value as the local count value for the first column line according to the storage instruction signal to output the local count value to the column readout device 70.

In the column parallel CMOS image sensors shown in FIGS. 1A and 1B, the number of pixels increases as the resolution thereof increases, and such an increase in the number of pixels causes an increase in the number of column lines.

Figure 2A:
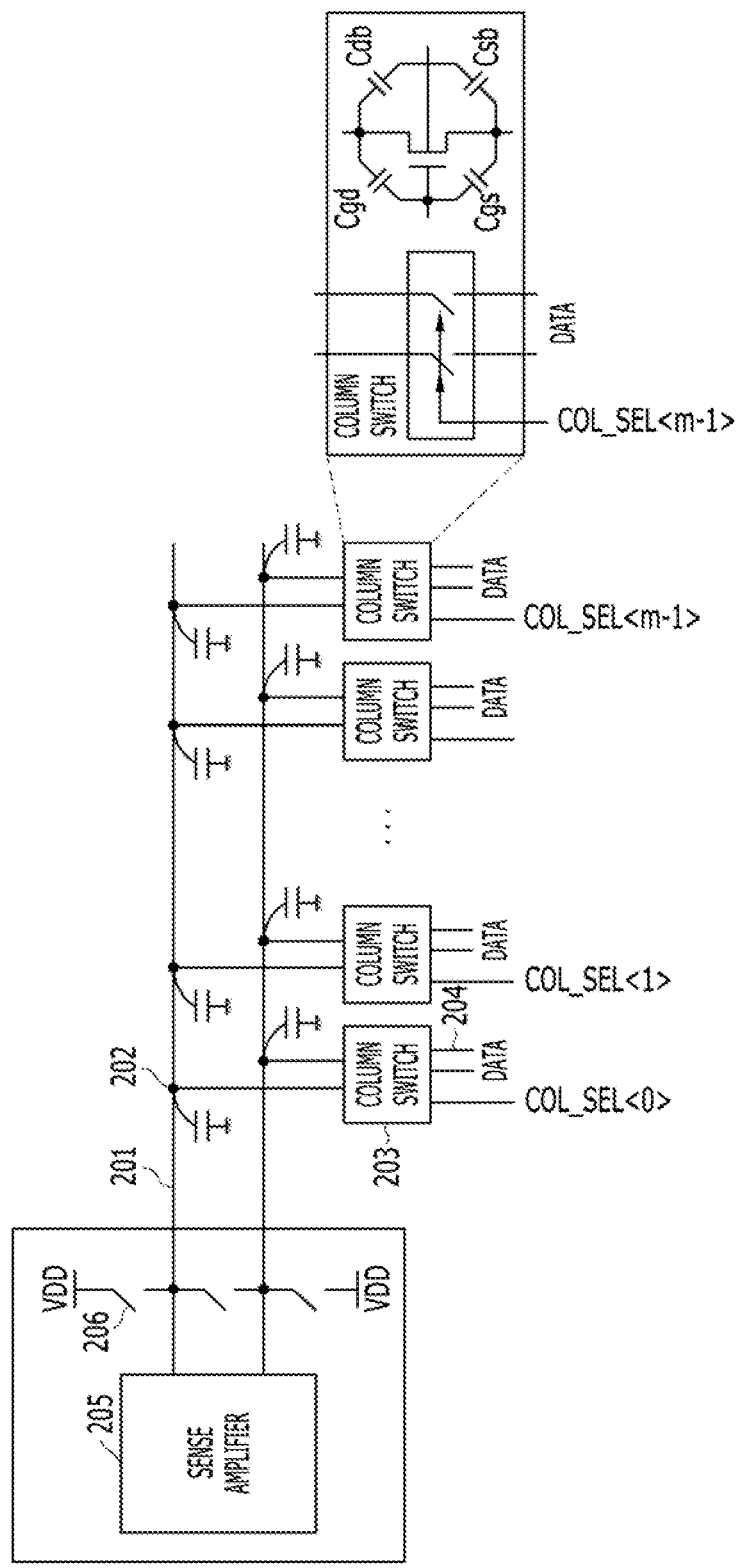
FIG. 2A is a block diagram illustrating an exemplary conventional column readout device.
Figure 2B:
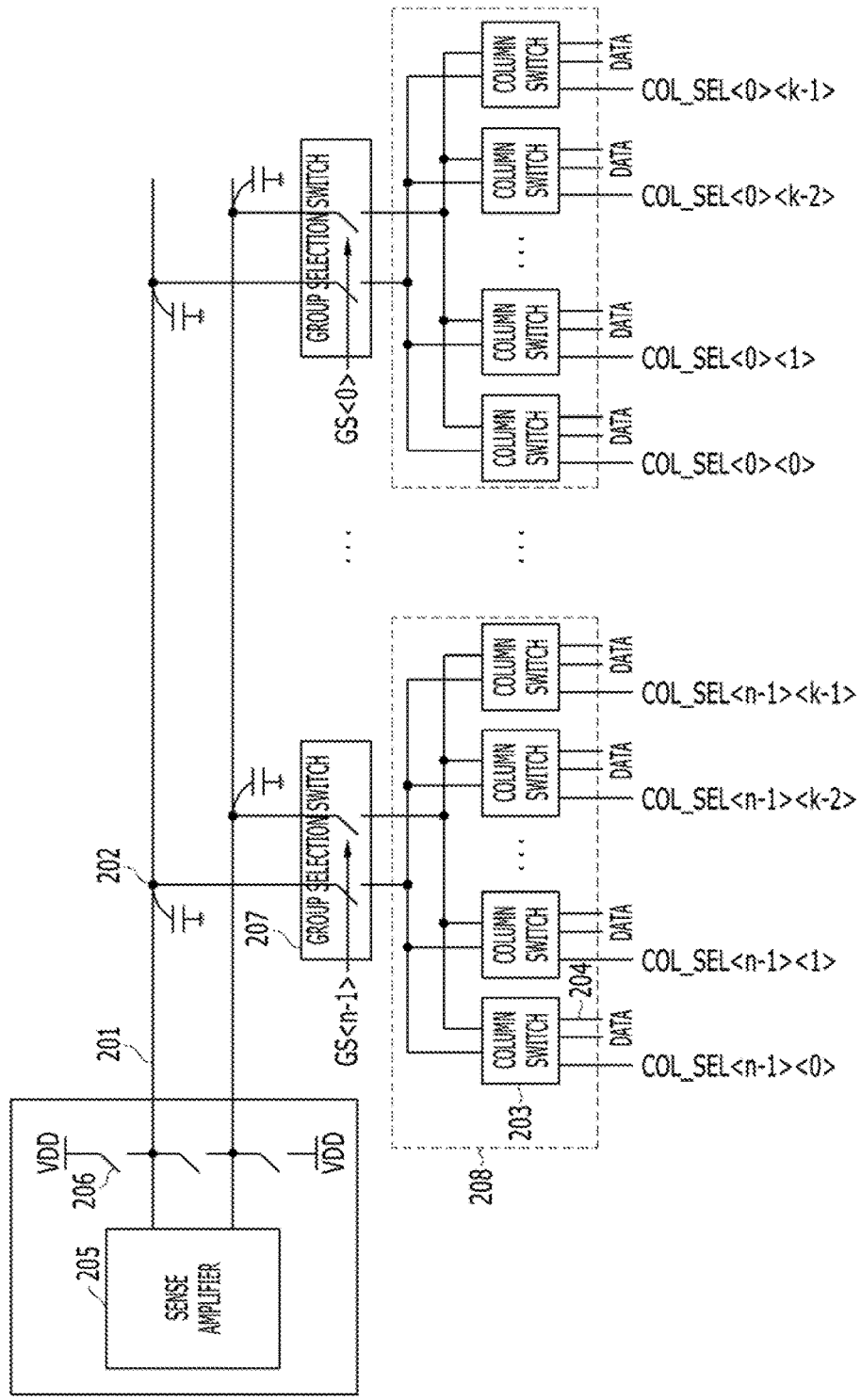
FIG. 2B is a block diagram illustrating another exemplary conventional column readout device.

FIG. 2A is a block diagram illustrating an exemplary column readout device, FIG. 2B is a block diagram illustrating another exemplary column readout device, and FIG. 2C is a timing diagram illustrating a binary-controlled group selection scheme. In FIGS. 2A and 2B, like reference numerals are used to refer to the same elements.

Referring to FIG. 2A, the column readout device includes a plurality of column switches 203, a sense amplifier 205, and a power on/off switch 206. The plurality of column switches 203 are connected to a column readout sensing node 202 of a sensing line 201, and can select one of input data 204 for respective column lines in response to a column select signal COL_SEL<0:m−1>, m being the number of the column lines, from a column decoder (not shown) to transfer the selected input data 204 to the column readout sensing node 202. The plurality of column switches 203 correspond to a plurality of column lines. Here, the input data 204 may include the count information from the memory block 60 in FIG. 1A or the local count values from the memory block 150 in FIG. 1B. The sense amplifier 205 amplifies the input data 204 transferred to the column readout sensing node 202 of the sensing line 201 through the plurality of column switches 203 to a level sufficient to be read out by the column readout device. The power on/off switch 206 supplies a power supply VDD to the sensing line 201 or cuts off the power supply VDD.

Each of the column switches 203 may be implemented by a metal-oxide-semiconductor field-effect transistor (MOSFET) transistor in which parasitic capacitances exist intrinsically. Some types of parasitic capacitances are illustrated in FIG. 2A. For example, the reference numeral 'Cgs' denotes a capacitance caused by an overlap between a gate and a source diffusion, the reference numeral 'Cgd' denotes a capacitance caused by an overlap between the gate and a drain diffusion, the reference numeral 'Csb' denotes a capacitance created by a depletion region between a source and bulk, and the reference numeral 'Cdb' denotes a capacitance created by a depletion region between a drain and the bulk.

In addition to the parasitic capacitances of the MOSFET transistor, the column readout sensing node 202 is affected by several parasitic capacitances including stray capacitances existing around the sensing line 201 itself and stray capacitances caused near the connections between output lines of the column switches 203 and the sensing line 201.

In such a column readout device, the increase in the number of column lines may cause an increase in the number of the column switches 203, which in turn increases the parasitic capacitances affecting the column readout sensing node 202. The increase of the parasitic capacitances may be disadvantageous in that it delays formation of a sensing voltage when data is read out by the sense amplifier 205 and lowers a readout speed of the column readout device. A column readout device shown in FIG. 2B may reduce such a drawback of the device shown in FIG. 2A.

Referring to FIG. 2B, the column readout device includes a sense amplifier 205, a power on/off switch 206, a plurality of group selection switches 207, and a plurality of column switch groups 208. The plurality of group selection switches 207 are connected to a column readout sensing node 202 of a sensing line 201, and can select one of the plurality of column switch groups 208 in response to a group select signal GS<0:n−1>, n being a positive integer greater than 1, from the column decoder (not shown). The plurality of column switch groups 208 are provided for respective group selection switches 207. In the case of being selected by a corresponding group selection switch 207, each of the plurality of column switch groups 208 selects one of the input data 204 for respective column lines in response to a column select signal COL_SEL<0:n−1><0:k−1>, k being a positive integer greater than 1, to transfer the selected input data 204 to the column readout sensing node 202. At this time, since a plurality of column switches 203 respectively correspond to a plurality of column lines, n*k becomes the number of the column lines, and the input data 204 may include the count information from the memory block 60 in FIG. 1A or the local count values from the memory block 150 in FIG. 1B. The sense amplifier 205 amplifies the input data 204 transferred to the column readout sensing node 202 of the sensing line 201 through the plurality of group selection switches 207 to a level sufficient to be read out by the column readout device. The power on/off switch 206 supplies a power supply VDD to the sensing line 201 or cuts off the power supply VDD.

As described above, in the column readout device shown in FIG. 2B, the plurality of column switches 203 are grouped into the plurality of column switch groups 208, and the group selection switches 207 are provided for respective column switch groups 208. The use of the group selection switches 207 may reduce the number of connections between output lines of the column switches 203 and the sensing line 201 and decrease the stray capacitances caused near the connections between the output lines of the column switches 203 and the sensing line 201. As a result, it is possible to reduce the parasitic capacitances affecting the column readout sensing node 202 and enhance the readout speed of the column readout device.

However, as shown in FIG. 2C, in a binary-controlled group selection scheme which is typically used for the selection of a group, a sensing error may occur in a first column in a column switch group when there is a timing mismatch between the group select signal GS<0:n−1> and the column select signal COL_SEL<0:n−1><0:k−1>. For example, in case of the column select signals COL_SEL<n−2><0> and COL_SEL<n−1><0>, a sensing margin may be reduced from 'A' to 'B' as shown in FIG. 2C. For reference, FIG. 2C shows a case where k is set to 8.

On the other hand, floating of the column readout sensing node 202 before an operation of the corresponding group selection switch 207 may bring about an error signal when a first column of a column switch group begins to be read.

According to embodiments of the present invention, the sensing error due to the timing mismatch between the group select signal and the column select signal is prevented by generating the group select signal based on the column select signal, and the reading error that may occur due to floating of the column readout sensing node when selecting a column switch group may be minimized by initializing a column switch group node before selecting a corresponding group selection switch, which are described in detail with reference to FIGS. 3A to 5B.

Figure 3A:
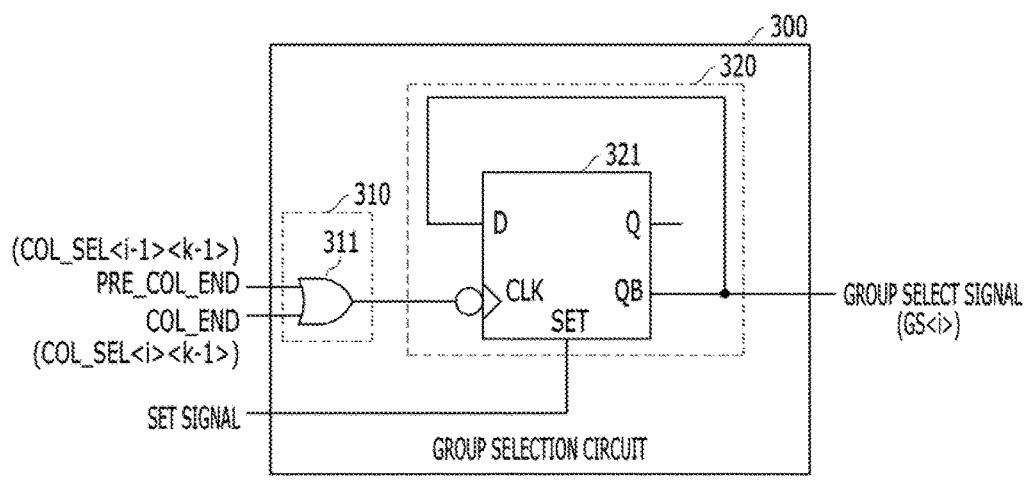
FIG. 3A is a circuit diagram illustrating a group selection circuit in accordance with an embodiment of the present invention.
Figure 3B:
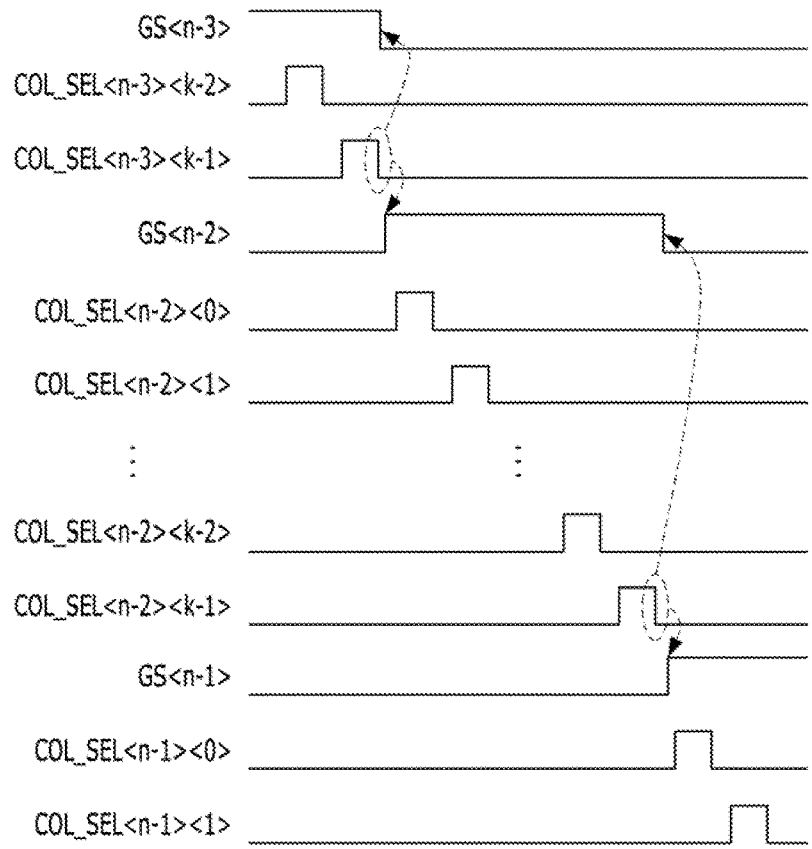
FIG. 3B is a timing diagram illustrating an operation of the group selection circuit of FIG. 3A.

FIG. 3A is a circuit diagram illustrating a group selection circuit 300 in accordance with an embodiment of the present invention, and FIG. 3B is a timing diagram illustrating an operation of the group selection circuit 300 of FIG. 3A.

Referring to FIG. 3A, the group selection circuit 300 may include an input block 310 and a group selection block 320. The input block 310 receives a last column select signal PRE_COL_END of a previous column switch group and a last column select signal COL_END of a current column switch group. The term "last column select signal" used herein refers to a column select signal that is used to select a last column associated with a column switch group. The group selection block 320 generates a group select signal that is activated from a falling edge of the last column select signal PRE_COL_END of the previous column switch group to a falling edge of the last column select signal COL_END of the current column switch group, in response to an output signal of the input block 310. Preferably, the group selection circuit 300 is provided for each column switch group in a column decoder.

For example, assuming that the group select signal is GS<i> in FIG. 2B, i being an integer from 0 to n−1, the last column select signal PRE_COL_END of the previous column switch group may become COL_SEL<i−1><k−1> and the last column select signal COL_END of the current column switch group may become COL_SEL<i><k−1>.

The input block 310 may include an OR gate 311 performing an OR operation on the last column select signal PRE_COL_END of the previous column switch group and the last column select signal COL_END of the current column switch group.

The group selection block 320 may include a set-type D-flipflop 321 that receives its negative output QB through its data terminal D and receives an output signal of the input block 310 through an inverted clock terminal to generate the group select signal GS<i> for activating a current group selection switch from the falling edge of the last column select signal PRE_COL_END of the previous column switch group to the falling edge of the last column select signal COL_END of the current column switch group. The group selection block 320 outputs the group select signal GS<i> through its negative output (QB) terminal.

As shown in FIG. 3B, the group selection circuit 300 generates the group select signal GS<i> to turn on the current group selection switch from the falling edge of the last column select signal PRE_COL_END of the previous column switch group to the falling edge of the last column select signal COL_END of the current column switch group. For example, the group select signal GS<n−2> is activated from the falling edge of the column select signal COL_SEL<n−3><k−1> to the falling edge of the column select signal COL_SEL<n−2><k−1>. Accordingly, the timing mismatch that may cause an error may be minimized.

Figure 4A:
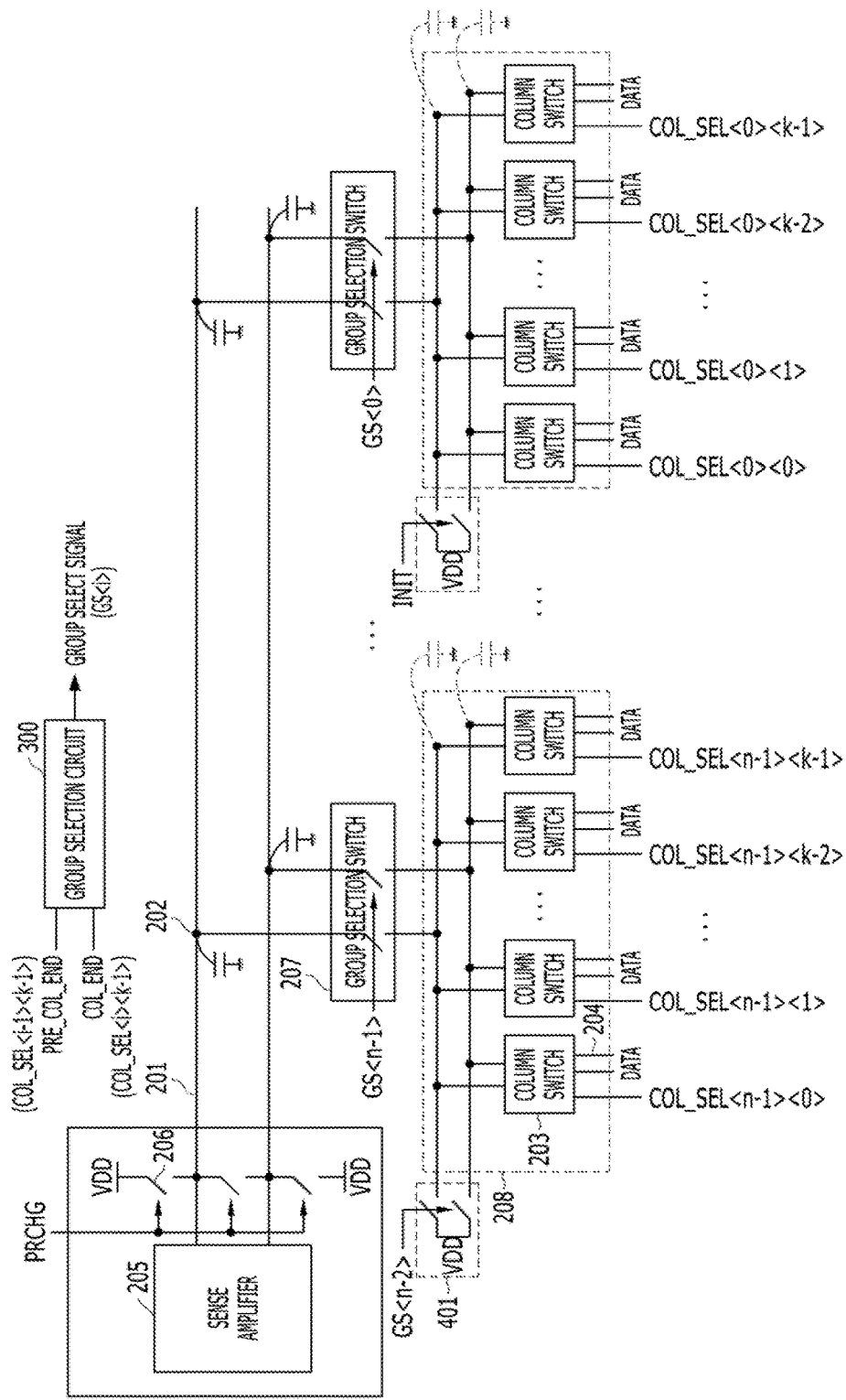
FIG. 4A is a block diagram illustrating a column readout device in accordance with an embodiment of the present invention.
Figure 4B:
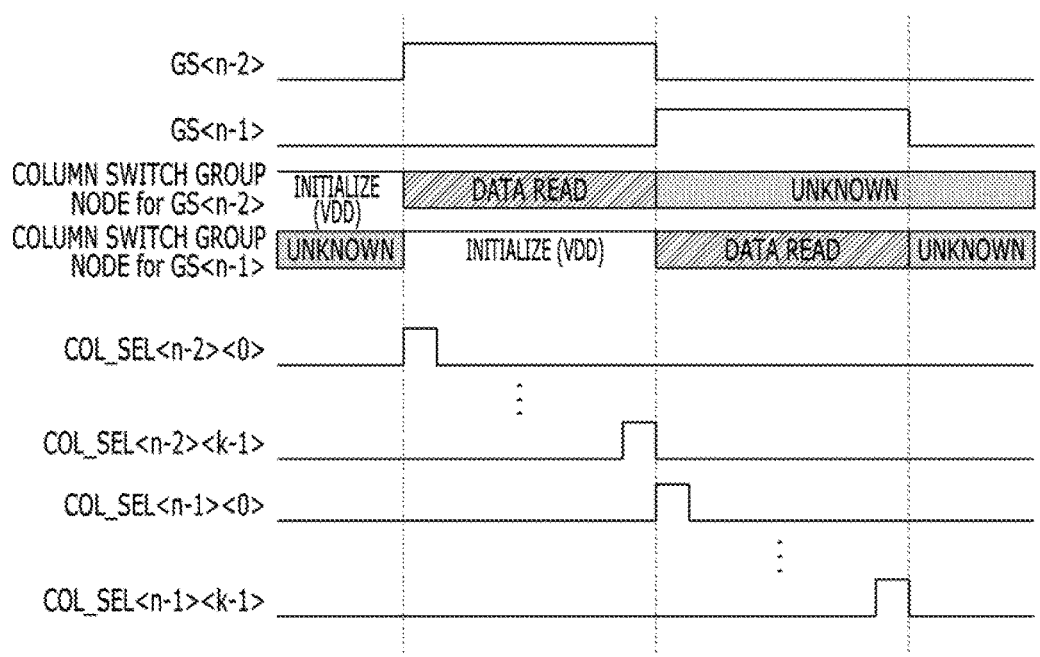
FIG. 4B is a timing diagram illustrating an operation of the column readout device of FIG. 4A.

FIG. 4A is a block diagram illustrating a column readout device in accordance with another embodiment of the present invention, and FIG. 4B is a timing diagram illustrating an operation of the column readout device of FIG. 4A.

Referring to FIG. 4A, the column readout device may include a sense amplifier 205, a power on/off switch 206, a plurality of group selection switches 207, a plurality of column switch groups 208, and a plurality of group selection circuits 300.

The plurality of group selection circuits 300 receives a last column select signal PRE_COL_END of a previous column switch group 208 and a last column select signal COL_END of a current column switch group, and generates a group select signal GS<0:n−1>, n being a positive integer greater than 1, that is activated from a falling edge of the last column select signal PRE_COL_END of the previous column switch group 208 to a falling edge of the last column select signal COL_END of the current column switch group 208.

The plurality of group selection switches 207 are connected to a column readout sensing node 202 of a sensing line 201, and select one of the plurality of column switch groups 208 in response to the group select signal GS<0:n−1> from the plurality of group selection circuits 300.

The plurality of column switch groups 208 are provided for respective group selection switches 207. Each of the plurality of column switch groups 208 includes a plurality of column switches 203 for selecting one of input data 204 for respective column lines in response to a column select signal COL_SEL<0:n−1><0:k−1>, k being a positive integer greater than 1, in a state of being selected by a corresponding group selection switch 207, to transfer the selected input data 204 to the column readout sensing node 202 through a corresponding column switch group node. The column switch group node is connected to an output terminal of each of the column switch groups 208. At this time, n*k becomes the number of the column lines, and the input data 204 may include the count information from the memory block 60 in FIG. 1A or the local count values from the memory block 150 in FIG. 1B.

The sense amplifier 205 amplifies the input data 204 transferred to the column readout sensing node 202 of the sensing line 201 through the plurality of group selection switches 207 to a level sufficient to be read out by the column readout device. The power on/off switch 206 supplies a power supply VDD to the sensing line 201 or cuts off the power supply VDD. The power on/off switch 206 may be turned on in response to a precharge signal PRCHG which is activated during an initial period.

The column readout device shown in FIG. 4A may further include a plurality of initialization switches 401 for initializing a corresponding column switch group node before selecting a group selection switch 207. Each of the plurality of initialization switches 401 operates according to an initialization signal INIT and a previous group select signal GS<0:n−2> that is used to select the previous column switch group 208, and initializes the column switch group node using the power supply VDD.

The operation of the column readout device of FIG. 4A will be described with reference to FIG. 4B.

First, before the current group selection switch 207 is selected, the column switch group node corresponding to the current group selection switch 207 is initialized. For example, before the group select signal GS<n-2> is selected, the column switch group node for the group select signal GS<n-2> is initialized. Further, before the group select signal GS<n-1> is selected, the column switch group node for the group select signal GS<n-1> is initialized.

Next, the current group selection switch 207 is turned on at the falling edge of the last column select signal PRE_COL_END of the previous column switch group. For example, the group select signal GS<n-1> is activated at the falling edge of the column select signal COL_SEL<n-2><k-1>.

Afterwards, the current group selection switch 207 is turned off at the falling edge of the last column select signal COL_END of the current column switch group. For example, the group select signal GS<n-1> is deactivated at the falling edge of the column select signal COL_SEL<n-1><k-1>.

Figure 5A:
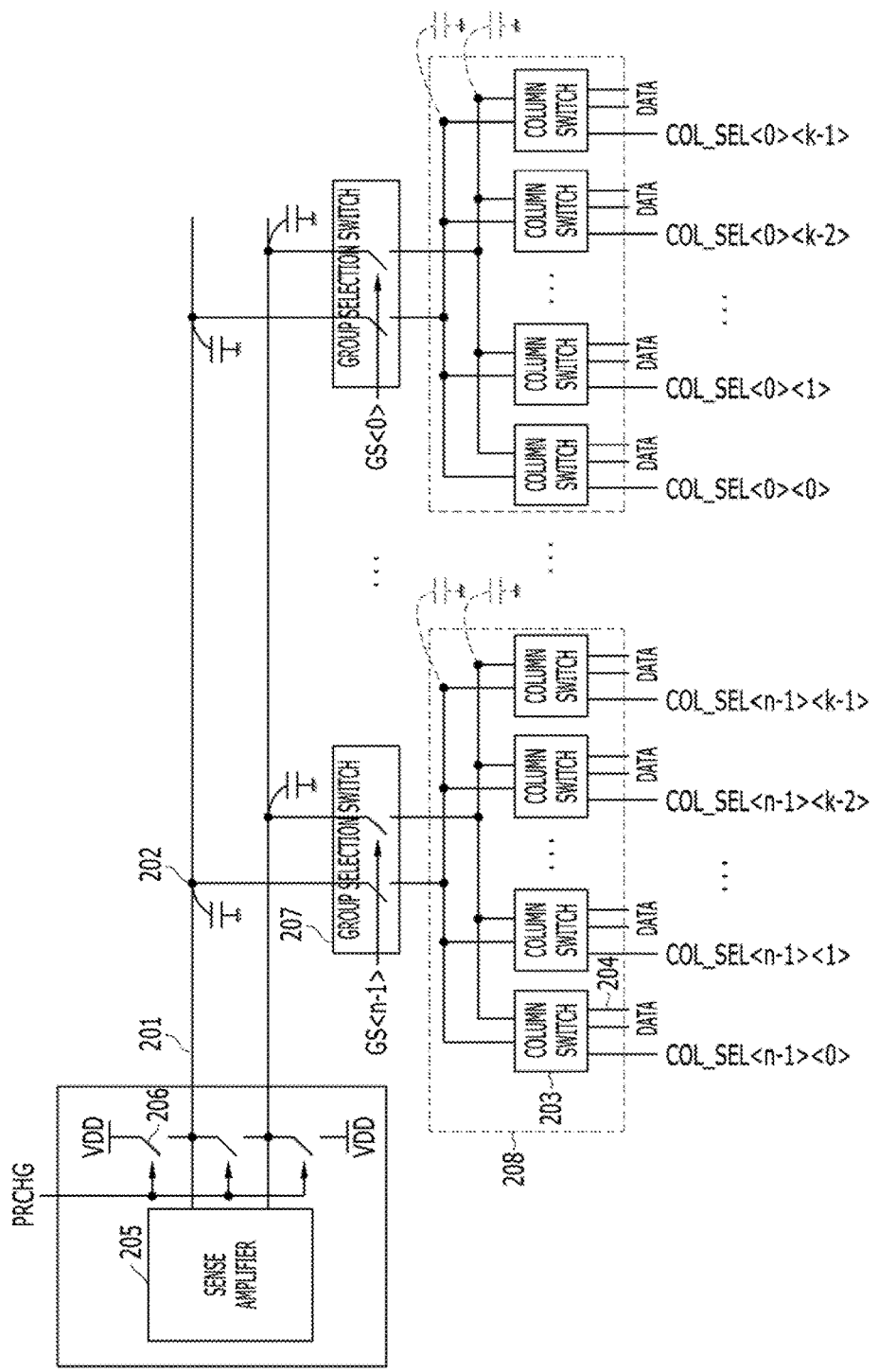
FIG. 5A is a block diagram of a column readout device in accordance with another embodiment of the present invention.
Figure 5B:
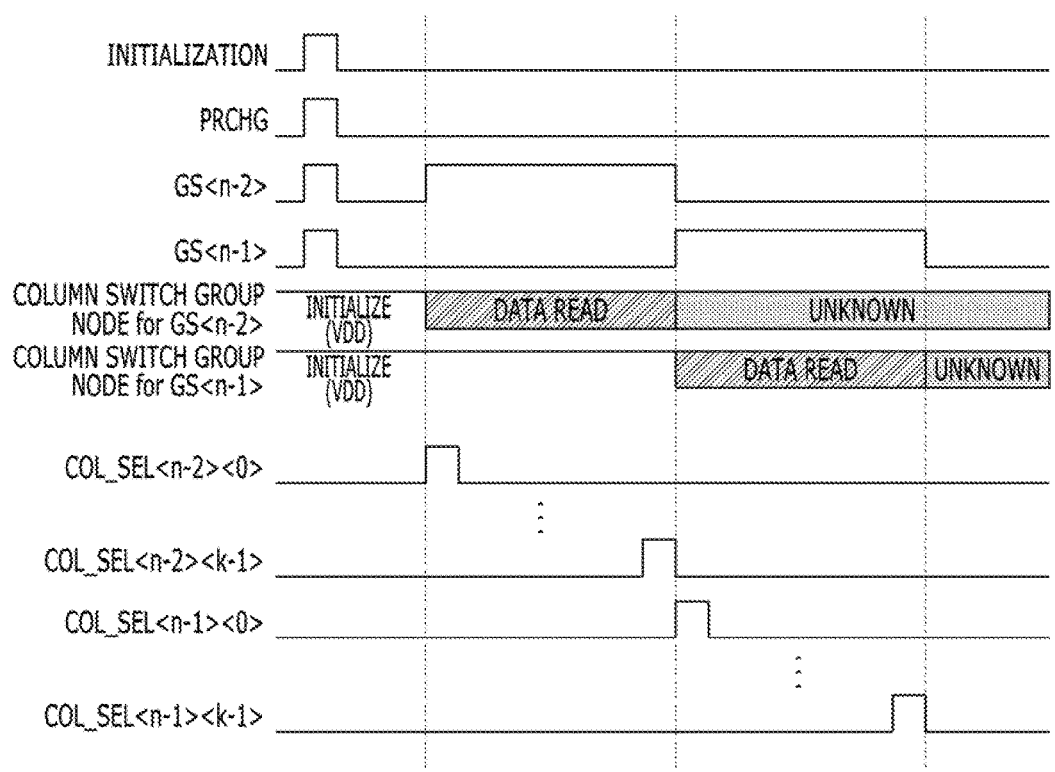
FIG. 5B is a timing diagram illustrating an operation of the column readout device of FIG. 5A.

FIG. 5A is a block diagram illustrating a column readout device in accordance with yet another embodiment of the present invention; and FIG. 5B is a timing diagram illustrating an operation of the column readout device of FIG. 5A.

The configuration and operation of the column readout device according to another embodiment shown in FIGS. 5A and 5B are similar to the configuration and operation of the column readout device shown in FIGS. 4A and 4B except that the column readout device of FIG. 5A does not include the initialization switches 401 but all the column switch group nodes are initialized in response to a common initialization signal INITIALIZATION provided globally before the readout operation starts as shown in FIG. 5B. For example, when the common initialization signal INITIALIZATION is activated, a precharge signal PRCHG and group select signals GS<0:n-1> are activated as shown in FIG. 5B and all the column switch group nodes are initialized. Here, the precharge signal PRCHG may be input from a precharge circuit (not shown) disposed adjacent to the sense amplifier 205.

As described above, the column readout device according to the embodiments of the present invention initializes the column switch group nodes before selecting the corresponding group selection switch, and thus minimizes the reading error that may occur when selecting the column switch group.

The embodiments of the present invention described are applicable to the CMOS image sensors as well as various circuits having the column parallel structure and including the column selection switch.

Although various embodiments have been described for illustrative purposes, it will be apparent to those skilled in the art that various changes and modifications may be made without departing from the spirit and scope of the invention as defined in the following claims.

What is claimed is:

1. A group selection circuit comprising:
   an input block suitable for receiving a last column select signal of a previous column switch group and a last column select signal of a current column switch group; and
   a group selection block suitable for generating a group select signal that is activated from a first edge of the last column select signal of the previous column switch group to a first edge of the last column select signal of the current column switch group, in response to an output signal of the input block.

2. The group selection circuit of claim 1, wherein the input block comprises:
   a logic gate suitable for performing an OR operation on the last column select signal of the previous column switch group and the last column select signal of the current column switch group.

3. The group selection circuit of claim 1, wherein the group selection block comprises:
   a flipflop suitable for having a data terminal suitable for receiving its negative output and an inverted clock terminal suitable for receiving an output signal of the input block to output the group select signal activated from the first edge of the last column select signal of the previous column switch group to the first edge of the last column select signal of the current column switch group.

4. The group selection circuit of claim 1,
   wherein the group selection block generates the group select signal to turn on a current group selection switch from a falling edge of the last column select signal of the previous column switch group to a falling edge of the last column select signal of the current column switch group.

5. A column readout device comprising:
   a plurality of group selection circuits suitable for generating a group select signal in response to a last column select signal of a previous column switch group and a last column select signal of a current column switch group;
   a plurality of group selection switches suitable for selecting one of a plurality of column switch groups in response to the group select signal; and
   the plurality of column switch groups, each having a plurality of column switches suitable for selecting one of input data for respective column lines in response to a column select signal, in a state of being selected by a corresponding group selection switch among the plurality of group selection switches, to transfer the selected input data to a column readout sensing node through a corresponding column switch group node.

6. The column readout device of claim 5, further comprising:
   a plurality of initialization switches suitable for initializing the corresponding column switch group node before the column switch group is selected among the plurality of column switch groups.

7. The column readout device of claim 6, wherein each of the plurality of initialization switches operates based on a previous group select signal used for selecting the previous column switch group, and initializes the corresponding column switch group node by using a power supply.

8. The column readout device of claim 6,
   wherein the column readout device initializes all column switch group nodes before a readout operation starts, in response to a common initialization signal provided globally.

9. The column readout device of claim 5, wherein the plurality of group selection circuits generate the group select signal that is activated from a first edge of the last column select signal of the previous column switch group to a first edge of the last column select signal of the current column switch group, in response to an output signal of the input block.

10. The column readout device of claim 5, wherein each of the plurality of group selection circuits comprises:
    an input block suitable for receiving the last column select signal of the previous column switch group and the last column select signal of the current column switch group; and a group selection block suitable for generating the group select signal which is activated from a falling edge of the last column select signal of the previous column switch group to a falling edge of the last column select signal of the current column switch group, in response to an output signal of the input block.

11. The column readout device of claim 10, wherein the input block comprises:
a logic gate suitable for performing an OR operation on the last column select signal of the previous column switch group and the last column select signal of the current column switch group.

12. The column readout device of claim 10, wherein the group selection block comprises:
a flipflop suitable for having a data terminal suitable for receiving its negative output and an inverted clock terminal suitable for receiving an output signal of the input block to output the group select signal activated from the falling edge of the last column select signal of the previous column switch group to the falling edge of the last column select signal of the current column switch group.

13. The column readout device of claim 5, further comprising:
a sense amplifier suitable for amplifying the input data transferred to the column readout sensing node of a sensing line to a level sufficient to be read out by the column readout device; and
a power on/off switch suitable for supplying a power supply to the sensing line in response to a precharge signal.

14. A column readout method comprising:
activating a current group selection switch in response to a first edge of a last column select signal of a previous column switch group; and
deactivating the current group selection switch in response to at a first edge of a last column select signal of a current column switch group.

15. The column readout method of claim 14, further comprising:
initializing a column switch group node connected to an output terminal of each of the column switch groups.

16. The column readout method of claim 15, wherein the initializing of the column switch group node comprises:
initializing a corresponding column switch group node before the current group selection switch is selected.

17. The column readout method of claim 16, wherein the initializing of the column switch group node comprises:
initializing the column switch group node by using a power supply based on a previous group select signal used for selecting the previous column switch group.

18. The column readout method of claim 15, wherein the initializing of the column switch group node comprises:
initializing all the column switch group nodes before a readout operation starts, in response to a common initialization signal provided globally.

19. The column readout method of claim 15, further comprising:
amplifying input data transferred to the column readout sensing node to a level sufficient to be read out.

20. The column readout method of claim 14, wherein the first edge includes a falling edge.

* * * * *